United States Patent
Liang et al.

(10) Patent No.: US 10,251,152 B2
(45) Date of Patent: Apr. 2, 2019

(54) PAGING METHOD, PAGING MESSAGE OBTAINING METHOD, BASE STATION, AND TERMINAL

(71) Applicant: China Academy of Telecommunications Technology, Beijing (CN)

(72) Inventors: Jing Liang, Beijing (CN); Yanping Xing, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 45 days.

(21) Appl. No.: 14/903,279

(22) PCT Filed: Aug. 7, 2014

(86) PCT No.: PCT/CN2014/083899
§ 371 (c)(1),
(2) Date: Jan. 6, 2016

(87) PCT Pub. No.: WO2015/018353
PCT Pub. Date: Feb. 12, 2015

(65) Prior Publication Data
US 2016/0157208 A1 Jun. 2, 2016

(30) Foreign Application Priority Data

Aug. 8, 2013 (CN) .......................... 2013 1 0344555

(51) Int. Cl.
*H04W 68/02* (2009.01)
*H04W 88/02* (2009.01)
(Continued)

(52) U.S. Cl.
CPC .......... *H04W 68/02* (2013.01); *H04B 17/318* (2015.01); *H04W 72/005* (2013.01);
(Continued)

(58) Field of Classification Search
CPC ..... H04W 68/02; H04W 74/08; H04W 72/00; H04W 72/005; H04B 17/318
See application file for complete search history.

(56) References Cited

U.S. PATENT DOCUMENTS 9,854,561 B2 * 12/2017 Yoshizawa ........ H04W 52/0216
2010/0271175 A1 * 10/2010 Chou ................... H04W 68/02
340/7.25
(Continued)

FOREIGN PATENT DOCUMENTS

CN 101350936 A 1/2009
CN 101827430 A 9/2010
(Continued)

OTHER PUBLICATIONS

International Search Report of PCT/CN2014/083899.
(Continued)

*Primary Examiner* — Khawar Iqbal
(74) *Attorney, Agent, or Firm* — Kilpatrick Townsend & Stockton LLP

(57) ABSTRACT

Disclosed are a paging method, paging message obtaining method, base station, and terminal, relating to the telecommunication technology. For a terminal requiring enhanced coverage, upon paging, repeating the paging in at least one paging cycle including the current paging cycle, such that the terminal requiring enhanced coverage determines the paging message by combining the content received during the first paging and the repeated paging, thereby reducing the occurrences of situations in which the terminal misses the paging and cannot be called.

8 Claims, 4 Drawing Sheets

(51) Int. Cl.
  H04W 72/00    (2009.01)
  H04W 74/08    (2009.01)
  H04B 17/318   (2015.01)
  H04W 88/08    (2009.01)
(52) U.S. Cl.
  CPC ............ *H04W 74/08* (2013.01); *H04W 88/02* (2013.01); *H04W 88/08* (2013.01)

(56) References Cited

U.S. PATENT DOCUMENTS

| | | | |
|---|---|---|---|
| 2013/0077579 A1* | 3/2013 | Cho | H04W 4/20 370/329 |
| 2013/0083753 A1* | 4/2013 | Lee | H04W 72/0453 370/329 |
| 2014/0098761 A1* | 4/2014 | Lee | H04W 74/006 370/329 |
| 2014/0128109 A1* | 5/2014 | Li | H04W 68/02 455/458 |
| 2014/0221024 A1* | 8/2014 | Xu | H04W 68/00 455/458 |
| 2014/0362752 A1* | 12/2014 | Jha | H04W 36/22 370/311 |
| 2016/0050626 A1* | 2/2016 | Chen | H04W 52/0225 370/311 |
| 2016/0174189 A1* | 6/2016 | Yoshizawa | H04W 52/0216 455/458 |
| 2016/0192323 A1* | 6/2016 | Kim | H04W 68/02 455/458 |
| 2016/0316432 A1* | 10/2016 | Hsu | H04W 52/0225 |
| 2017/0105166 A1* | 4/2017 | Lee | H04W 16/24 |
| 2017/0195989 A1* | 7/2017 | Zhang | H04W 4/021 |
| 2018/0167995 A1* | 6/2018 | Jha | H04W 36/22 |

FOREIGN PATENT DOCUMENTS

| | | |
|---|---|---|
| CN | 102316580 A | 1/2012 |
| WO | 2011140903 A1 | 11/2011 |
| WO | 2013/007193 A1 | 1/2013 |
| WO | 2014/055878 A1 | 4/2014 |
| WO | 2015/026285 A2 | 2/2015 |
| WO | 2015/184642 A1 | 12/2015 |

OTHER PUBLICATIONS

Alcatel-Lucent et al., "Configurable repetition level for PBCH", 3GPP Draft; R1-132055—REL-12 UMTS HETNET—Configurable PBCH Repetition Vo. 2, $3^{rd}$ Generation Partnership Project (3GPP), Mobile Competence Centre; 650, Route des Lucioles; F-06921 Sophia-Antipolis, vol. RAN WGI, No. Fukuoka, Japan; May 20, 2013-May 24, 2013, May 11, 2013, XP050697837, Retreived from the Internet: URL: http://www.3gpp.org/ftp/tsg_ran/WG1_RL1/TSGR_73/Docs/ [retrieved on May 11, 2013] *the whole document*.

Huawei et al., "Coverage enhancement for physical channels and signals for low-cost MTC", 3GPP Draft; R1-130017, $3^{rd}$ Generation Partnership Project (3GPP), Mobile Competence Centre; 650, Route des Lucioles; F-06921 Sophia-Antipolis Cedex; France, vol. RAN WG1, No. St. Julian; Jan. 28, 2013-Feb. 1, 2013 Jan. 19, 2013, XP050663499, Retrieved from the Internet: URL: http://www.3gpp.org/ftp/tsg_ran/WGI_RL1/TSGR1_72/Docs/ [retrieved on Jan. 19, 2013] * paragraph [02.4]*.

Extended European Search Report for EP 14833926 dated Jun. 22, 2016, 12 pages.

* cited by examiner

PAGING METHOD, PAGING MESSAGE OBTAINING METHOD, BASE STATION, AND TERMINAL

This application is a US National Stage of International Application No. PCT/CN2014/083899, filed on Aug. 7, 2014, designating the United States, and claiming the benefit of Chinese Patent Application No. 201310344555.3, filed with the State Intellectual Property Office of People's Republic of China on Aug. 8, 2013 and entitled "Paging method, paging message obtaining method, base station and terminal", which is hereby incorporated by reference in its entirety.

FIELD

The present invention relates to the field of communications, and particularly to a paging method paging message obtaining method, base station and terminal.

BACKGROUND

Machine to Machine (M2M) communication is a future development trend in intelligent communication. The Machine Type Communication (MTC) function needs to be supported in the Universal Mobile Telecommunication System (UMTS) and its Long Term Evolution (LTE) system. An MTC device (MTC terminal) can have a part of a number of M2M communication characteristics, e.g., low mobility, a small amount of transmission data, insensitivity to a communication delay, requirement for extremely low power consumption, etc.

1. MTC

MTC, which is a new communication idea, is intended to integrate a variety of communication technologies, e.g., machine to machine communication, machine controlled communication, human to machine interaction communication, mobile intercommunication, etc., to thereby drive the development of social production and life styles. Future human to human communication services are expected to account for only ⅓ of the entire market of terminals, whereas inter-machine (small-bandwidth system) communication services may account for a higher proportion of communication.

An existing mobile communication network is designed, for example, the capacity of the network is determined, for interpersonal communication. If the mobile communication network is expected to support small-bandwidth system communication, then the mechanism of the mobile communication system will be optimized for the characteristics of small-bandwidth system communication to thereby better enable small-bandwidth system communication with an insignificant or no influence upon legacy interpersonal communication.

Some possible characteristics of MTC communication are currently identified as follows:

The MTC terminal has low mobility;

The MTC terminal transmits data with the network side in a controllable period of time, that is, the MTC terminal can only access to the network in a network specified period of time.

The MTC terminal transmits data with the network side without high requirement on real time data transmission, which means temporal tolerance.

The MTC terminal is limited in energy, so power consumption thereof is required to be extremely low.

Only small data is transmitted between the MTC terminal and the network side.

The MTC terminal can be managed per group.

A real MTC terminal can have one or more of the characteristics above.

2. Paging Mechanism

There are two states of a terminal in the LTE system, i.e., the RRC_connected (RRC stands for Radio Resource Control) state and the RRC_idle state.

The terminal operating in the RRC_idle state primary detects paging of the network side. The terminal typically detects paging in the Discrete Receive (DRX) mode for the purpose of saving power, where only one sub-frame (1 ms) of each paging cycle is in a reception state, and the remaining periodicity is in non reception state, as illustrated in FIG. 1.

As illustrated in FIG. 2, for a paging procedure, paging is initiated by a core network entity, and the paging message is firstly transmitted to an eNB (evolved NodeB). Where the paging message carries DRX configuration specific to a User Equipment (UE, i.e., terminal). In the LTE system, the eNB compares the DRX cycle with a DRX cycle configured in a system message, and transmits the paging message at the shorter one of the DRX cycles.

The calculation of the position where the terminal receives paging is associated directly with a System Frame Number (SFN), and an International Mobile Subscriber Identity (IMSI) of the terminal (see the 3GPP Protocol TS 36.304). The paging identifier of the terminal (UE_ID) is derived in the equation of UE_ID=IMSI mod 1024. The IMSI is a globally unique identifier of the terminal including no more than 15 digits, each of which is an integer between 0 and 9, for example, IMSI=12345678901234.

The terminal can only receive a paging message at most once in a paging cycle. However for the terminal operating in some scenario, for example, the terminal operating underground, in a shopping mall, or at the corner of a building, a radio signal may be seriously shielded and thus significantly attenuated so that the terminal can not communicate with the network, but deep coverage by the network in such a scenario may result in a considerable increase in deployment cost of the network, including an added expense of equipments, an added cost of network planning, an added expense of manual maintenance, etc; and the M2M services will be deployed in the LTE network along with the evolvement of wireless communications, so it will be desirable to effectively extend coverage by the network in later LTE-based wireless communications to thereby address the problem of covering the terminal operating in the scenario above.

For these MTC terminals requiring for coverage enhancement, the paging message received only once can not be decoded correctly, so that the terminals may miss paging and thus can not be called, thus degrading a user experience, and the overall performance of the system.

The UE has a chance to receive paging at the beginning of a paging cycle, and the base station can retransmit for the terminal several times in at least one other paging cycle after the paging cycle, so that the terminal will have a further chance to receive paging if the terminal has failed to receive the first paging. However for those MTC terminal required for coverage enhancement, if the retransmission is performed in this way, then it can not be guaranteed that the paging can be received correctly with the number of retransmissions, and there may be a significant delay in the current retransmitting paging, such as a delay of tens of seconds.

SUMMARY

Embodiments of the invention provide a paging method, and a method for obtaining a paging message, and a base station and a terminal so as to reduce the occurrences of the terminal missing paging and thus failing to be called.

An embodiment of the invention provides a paging method including:

determining, by a base station, a terminal requiring coverage enhancement; and after the terminal requiring coverage enhancement is initially paged at a beginning of a paging cycle, paging repeatedly, by the base station, the terminal requiring coverage enhancement, in at least one paging cycle including the current paging cycle, so that the terminal requiring coverage enhancement determines a paging message from information received in initial paging and repeated paging; and Since the base station pages repeatedly the terminal requiring coverage enhancement, after initial paging, a success ratio for the terminal to receive the paging message can be improved, and thus reducing the occurrences of the terminal missing paging and thus failing to be called.

Furthermore in order to shorten a delay as much as possible, after the terminal requiring coverage enhancement is initially paged at the beginning of the paging cycle, paging repeatedly, by the base station, the terminal requiring coverage enhancement, in at least one paging cycle including the current paging cycle includes:

after the terminal requiring coverage enhancement is initially paged at the beginning of the paging cycle, paging repeatedly, by the base station, the terminal requiring coverage enhancement, respectively in a preset number of consecutive sub-frames in which the paging can be performed, wherein the preset number is a preset number of times of repeated paging.

Or after the base station initially pages the terminal requiring coverage enhancement, at the beginning of the paging cycle, and before the base station pages repeatedly the terminal requiring coverage enhancement, in at least one paging cycle including the current paging cycle, the method further includes:

broadcasting, by the base station, to all of terminals a repeated paging cycle at which the terminal requiring coverage enhancement, is paged repeatedly; and after the terminal requiring coverage enhancement is initially paged at the beginning of the paging cycle, paging repeatedly, by the base station, the terminal requiring coverage enhancement, in at least one paging cycle including the current paging cycle includes:

after the terminal requiring coverage enhancement is initially paged at the beginning of the paging cycle, paging repeatedly, by the base station, the terminal requiring coverage enhancement, in sub-frames in which the paging can be performed, according to the repeated paging cycle in at least one paging cycle including the current paging cycle until a preset number of times of repeated paging is reached, wherein the repeated paging cycle is shorter than the paging cycle.

Furthermore in order to lower a system overhead, after the base station initially pages the terminal requiring coverage enhancement, at the beginning of the paging cycle, and before the base station pages repeatedly the terminal requiring coverage enhancement, in at least one paging cycle including the current paging cycle, the method further includes:

broadcasting, by the base station, to all of terminals the positions of sub-frames in which the terminal requiring coverage enhancement, is paged repeatedly; and after the terminal requiring coverage enhancement is initially paged at the beginning of the paging cycle, paging repeatedly, by the base station, the terminal requiring coverage enhancement, in at least one paging cycle including the current paging cycle includes:

after the terminal requiring coverage enhancement is initially paged at the beginning of the paging cycle, paging repeatedly, by the base station, the terminal requiring coverage enhancement, in the sub-frames at the preset positions in at least one paging cycle including the current paging cycle until a preset number of times of repeated paging is reached.

Particularly determining, by the base station, the terminal requiring coverage enhancement includes:

receiving, by the base station, a paging identifier transmitted by the terminal requiring coverage enhancement, and determining the terminal corresponding to the paging identifier as a terminal requiring coverage enhancement.

An embodiment of the invention provides a method for obtaining a paging message, the method including:

determining, by a terminal, that the terminal is a terminal requiring coverage enhancement;

receiving, by the terminal, paging messages when the terminal is initially paged by a base station at the beginning of a paging cycle, and when the terminal is paged repeatedly by the base station in at least one paging cycle including the current paging cycle; and determining, by the terminal, a paging message from repeatedly received information.

Since the terminal further receives the paging messages when the terminal is paged repeatedly by the base station, after receiving the paging message in initial paging, and determines the paging message from repeatedly received information, thereby reducing the occurrences of the terminal missing paging and thus failing to be called.

Particularly determining, by the terminal, that the terminal is a terminal requiring coverage enhancement includes:

determining, by the terminal, that the terminal is a terminal requiring coverage enhancement, upon determining that a downlink channel quality thereof is below a preset threshold, or that the number of retransmissions thereof for initiating a random access in the uplink is above a preset threshold, or that coverage enhancement is enforced in uplink transmission thereof.

Preferably in order to enable the base station to determine the terminal requiring coverage enhancement, after the terminal determines that the terminal is a terminal requiring coverage enhancement, and before the terminal receives the paging messages when the terminal is initially paged by the base station at the beginning of the paging cycle, and when the terminal is paged repeatedly by the base station in at least one paging cycle including the current paging cycle, the method further includes:

determining and reporting, by the terminal, its own paging identifier to the base station.

Furthermore receiving, by the terminal, paging messages when the terminal is initially paged by the base station at the beginning of the paging cycle, and when the terminal is paged repeatedly by the base station in at least one paging cycle including the current paging cycle includes:

receiving, by the terminal, the paging messages respectively in a sub-frame in which the terminal is initially paged by the base station at the beginning of the paging cycle, and in a preset number of consecutive sub-frames in which the paging can be performed, after initial paging.

Or before the terminal receives the paging messages when the terminal is initially paged by the base station at the beginning of the paging cycle, and when the terminal is paged repeatedly by the base station in at least one paging cycle including the current paging cycle, the method further includes:

receiving, by the terminal, a repeated paging cycle, broadcast by the base station, at which the terminal requiring coverage enhancement, is paged repeatedly; and receiving, by the terminal, the paging messages when the terminal is initially paged by the base station at the beginning of the paging cycle, and when the terminal is paged repeatedly by the base station in at least one paging cycle including the current paging cycle includes:

receiving, by the terminal, the paging message when the terminal is initially paged by the base station at the beginning of the paging cycle, and receiving the paging messages according to the repeated paging cycle in at least one paging cycle including the current paging cycle, after initial paging, wherein the repeated paging cycle is shorter than the paging cycle.

Or before the terminal receives the paging messages when the terminal is initially paged by the base station at the beginning of the paging cycle, and when the terminal is paged repeatedly by the base station in at least one paging cycle including the current paging cycle, the method further includes:

receiving, by the terminal, the positions, broadcast by the base station, of sub-frames in which the paging is performed repeatedly; and receiving, by the terminal, the paging messages when the terminal is initially paged by the base station at the beginning of the paging cycle, and when the terminal is paged repeatedly by the base station in at least one paging cycle including the current paging cycle includes:

receiving, by the terminal, the paging message when the terminal is initially paged by the base station at the beginning of the paging cycle, and receiving the paging messages in the sub-frames at the preset positions in at least one paging cycle including the current paging cycle, after initial paging.

An embodiment of the invention further provides a base station including:

a determining unit configured to determine a terminal requiring coverage enhancement; and a paging unit configured, after the terminal requiring coverage enhancement is initially paged at the beginning of a paging cycle, to page repeatedly the terminal requiring coverage enhancement, in at least one paging cycle including the current paging cycle, so that the terminal requiring coverage enhancement determines a paging message from information received in initial paging and repeated paging.

Since the base station pages repeatedly the terminal requiring coverage enhancement, after initial paging, a success ratio for the terminal to receive the paging message can be improved, thereby reducing the occurrences of the terminal missing paging and thus failing to be called.

Furthermore in order to shorten a delay as much as possible, the paging unit is configured:

after the terminal requiring coverage enhancement is initially paged at the beginning of the paging cycle, to page repeatedly the terminal requiring coverage enhancement, respectively in a preset number of consecutive sub-frames in which the paging can be performed, wherein the preset number is a preset number of times of repeated paging.

Or the paging unit is further configured to broadcast to all of terminals a repeated paging cycle at which the terminal requiring coverage enhancement, is paged repeatedly, after the terminal requiring coverage enhancement is initially paged at the beginning of the paging cycle, and before the terminal requiring coverage enhancement, is paged repeatedly in at least one paging cycle including the current paging cycle; and the paging unit configured, after the terminal requiring coverage enhancement is initially paged at the beginning of the paging cycle, to page repeatedly the terminal requiring coverage enhancement, in at least one paging cycle including the current paging cycle is configured:

after the terminal requiring coverage enhancement is initially paged at the beginning of the paging cycle, to page repeatedly the terminal requiring coverage enhancement, in sub-frames in which the paging can be paged, according to the repeated paging cycle in at least one paging cycle including the current paging cycle until a preset number of times of repeated paging is reached, wherein the repeated paging cycle is shorter than the paging cycle.

Or the paging unit is further configured to broadcast to all of terminals the positions of sub-frames in which the terminal requiring coverage enhancement, is paged repeatedly, after the terminal requiring coverage enhancement is initially paged at the beginning of the paging cycle, and before the terminal requiring coverage enhancement, is paged repeatedly in at least one paging cycle including the current paging cycle; and the paging unit configured, after the terminal requiring coverage enhancement is initially paged at the beginning of the paging cycle, to page repeatedly the terminal requiring coverage enhancement, in at least one paging cycle including the current paging cycle is configured:

after the terminal requiring coverage enhancement is initially paged at the beginning of the paging cycle, to page repeatedly the terminal requiring coverage enhancement, in the sub-frames at the preset positions in at least one paging cycle including the current paging cycle until a preset number of times of repeated paging is reached.

Particularly the determining unit is configured:

to receive a paging identifier transmitted by the terminal requiring coverage enhancement, and to determine the terminal corresponding to the paging identifier as a terminal requiring coverage enhancement.

An embodiment of the invention provides a terminal including:

an enhancement determining unit configured to determine that the terminal is a terminal requiring coverage enhancement;

a receiving unit configured to receive paging messages when the terminal is initially paged by a base station at the beginning of a paging cycle, and when the terminal is paged repeatedly by the base station in at least one paging cycle including the current paging cycle; and a message determining unit configured to determine a paging message from repeatedly received information.

The terminal further receives the paging messages when the terminal is paged repeatedly by the base station, after receiving the paging message in initial paging, and determines the paging message from repeatedly received information, thereby reducing the occurrences of the terminal missing paging and thus failing to be called.

Particularly the enhancement determining unit is configured:

to determine that the terminal is a terminal requiring coverage enhancement, upon determining that a downlink channel quality thereof is below a preset threshold, or that the number of retransmissions thereof for initiating a random access in the uplink is above a preset threshold, or that coverage enhancement is enforced in uplink transmission thereof.

Preferably in order to enable the base station to determine the terminal requiring coverage enhancement, the enhancement determining unit is further configured:

to determine and report its own paging identifier to the base station upon determining that the terminal is a terminal requiring coverage enhancement.

Furthermore the receiving unit is configured:

to receive the paging messages respectively in a sub-frame in which the terminal is initially paged by the base station at the beginning of the paging cycle, and in a preset number of consecutive sub-frames in which the paging can be performed, after initial paging.

Or the receiving unit is further configured:

to receive a repeated paging cycle, broadcast by the base station, at which the terminal requiring coverage enhancement, is paged repeatedly, before the paging messages are received when the terminal is initially paged by the base station at the beginning of the paging cycle, and when the terminal is paged repeatedly by the base station in at least one paging cycle including the current paging cycle; and the receiving unit configured to receive the paging messages when the terminal is initially paged by a base station at the beginning of the paging cycle, and when the terminal is paged repeatedly by the base station in at least one paging cycle including the current paging cycle is configured:

to receive the paging message when the terminal is initially paged by the base station at the beginning of the paging cycle, and to receive the paging messages according to the repeated paging cycle in at least one paging cycle including the current paging cycle, after initial paging, wherein the repeated paging cycle is shorter than the paging cycle.

Or the receiving unit is further configured:

to receive the positions, broadcast by the base station, of sub-frames in which the paging is performed repeatedly, before the paging messages are received when the terminal is initially paged by the base station at the beginning of the paging cycle, and when the terminal is paged repeatedly by the base station in at least one paging cycle including the current paging cycle; and the receiving unit configured to receive the paging messages when the terminal is initially paged by a base station at the beginning of the paging cycle, and when the terminal is paged repeatedly by the base station in at least one paging cycle including the current paging cycle is configured:

to receive the paging message when the terminal is initially paged by the base station at the beginning of the paging cycle, and to receive the paging messages in the sub-frames at the preset positions in at least one paging cycle including the current paging cycle, after initial paging.

The embodiments of the invention provide a paging method, a method for obtaining a paging message, and a base station and a terminal, where after the terminal requiring coverage enhancement is paged, the terminal is paged repeatedly in at least one paging cycle including a current paging cycle so that the terminal requiring coverage enhancement determines a paging message from information received in initial paging and repeated paging to thereby reduce the occurrences of the terminal missing paging and thus failing to be called.

DETAILED DESCRIPTION OF THE EMBODIMENTS

The embodiments of the invention provide a paging method, an obtaining paging message method, a base station and a terminal, where after the terminal requiring coverage enhancement, is paged, the terminal is paged repeatedly in at least one paging cycle including a current paging cycle so that the terminal requiring coverage enhancement determines a paging message from information received in initial paging and repeated paging to thereby reduce the occurrences of the terminal missing paging and thus failing to be called.

Figure 1:
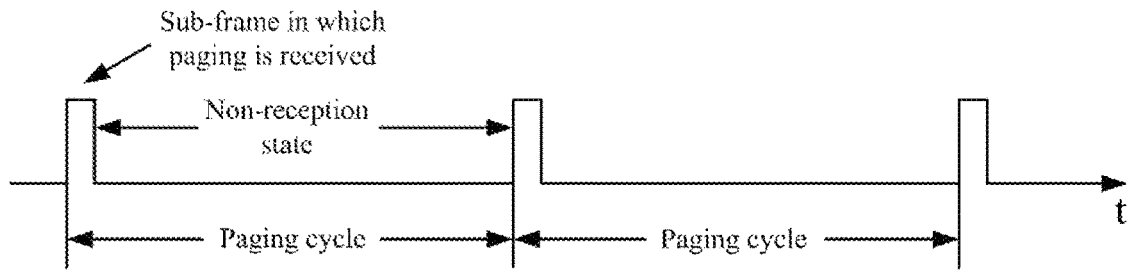
FIG. 1 is a schematic diagram of the position of a sub-frame in which the terminal receives paging in the prior art.
Figure 2:
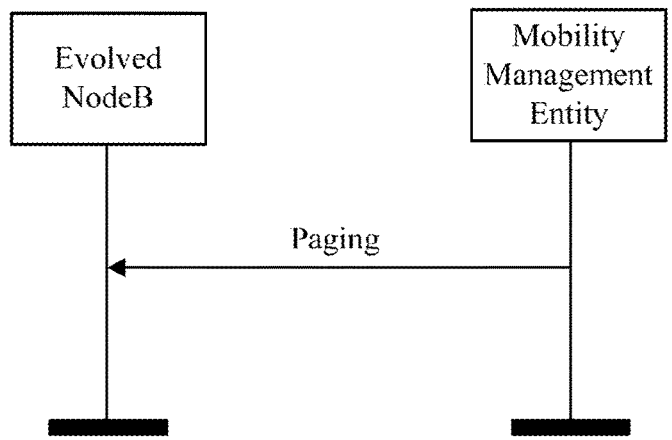
FIG. 2 is a schematic diagram of transmitting a paging message in the prior art.
Figure 3:
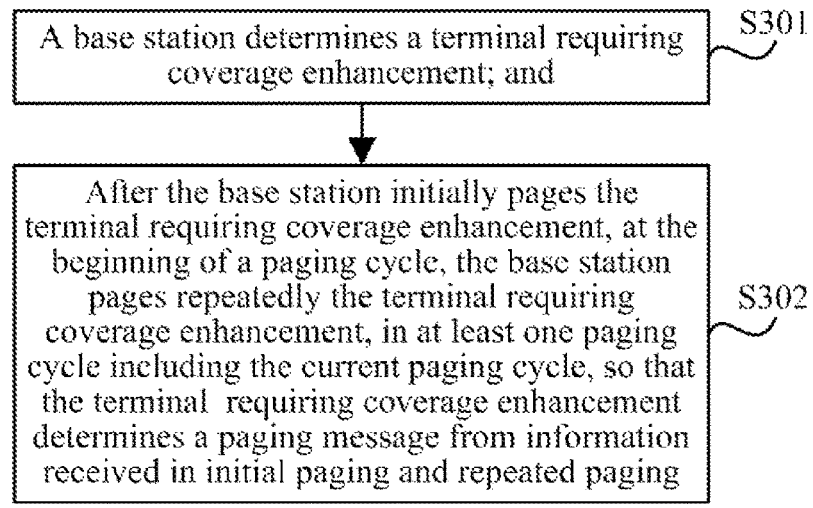
FIG. 3 is a flow chart of a paging method according to an embodiment of the invention.

As illustrated in FIG. 3, a paging method according to an embodiment of the invention includes:

In the operation S301, a base station determines a terminal requiring coverage enhancement; and In the operation S302, after the base station initially pages the terminal requiring coverage enhancement, at the beginning of a paging cycle, the base station pages repeatedly the terminal requiring coverage enhancement, in at least one paging cycle including the current paging cycle, so that the terminal requiring coverage enhancement determines a paging message from information received in initial paging and repeated paging.

In the operation S302, the base station pages many times the terminal requiring coverage enhancement, so that even if the terminal misses the initial paging, then it will be very probable for the terminal to obtain the paging message in repeated paging to thereby reduce the occurrences of the terminal missing paging and thus failing to be called.

In the operation S301, the base station needs to determine the terminal requiring coverage enhancement, and particularly the base station can receive a paging identifier transmitted by the terminal requiring coverage enhancement, and thus determine the terminal corresponding to the paging identifier as the terminal requiring coverage enhancement.

The terminal as referred to in the embodiment of the invention can be an MTC terminal, or can be another terminal supporting DRX, although the MTC terminal will be described as an example in particular embodiments.

The base station can page repeatedly the terminal in preset sub-frames in which the terminal can be paged, for example, in an LTE Frequency Division Duplex (FDD) system, all of sub-frames #0, #4, #5, and #9 in each radio frame are preset sub-frames in which paging can be performed, and in an LTE Time Division Duplex (TDD) system, all of sub-frames #0, #1, #5, and #6 in each radio frame are preset sub-frames in which paging can be performed; and the terminal can be paged repeatedly by paging repeatedly the terminal for a preset number of times in a preset number of consecutive sub-frames in which paging can be performed, or by paging repeatedly the terminal in discrete sub-frames in which paging can be performed, in a specific pattern, and these two repeated paging approaches will be described below in details by way of particular embodiments.

First Embodiment

In this embodiment, the base station performs paging repeatedly for a preset number of times in a preset number of consecutive sub-frames in which paging can be performed, and at this time, in the operation S302, after the base station initially pages the terminal requiring coverage enhancement at the beginning of the paging cycle, the base station pages repeatedly the terminal requiring coverage enhancement, in at least one paging cycle including the current paging cycle particularly as follows:

After the base station initially pages the terminal requiring coverage enhancement at the beginning of the paging cycle, the base station pages repeatedly the terminal requiring coverage enhancement, respectively in a preset number of consecutive sub-frames in which the paging can be performed, where the preset number is a preset number of times of repeated paging.

Figure 4:
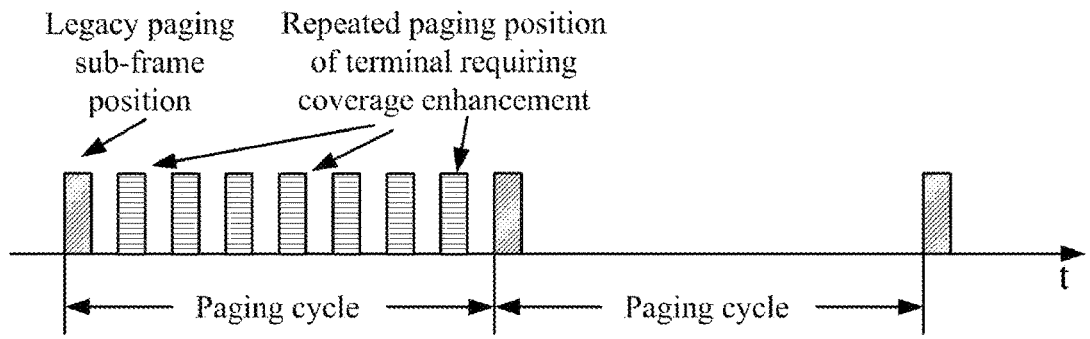
FIG. 4 is a schematic diagram of the positions of sub-frames in which a terminal receives paging according to a first embodiment of the invention.

As illustrated in FIG. 4, the terminal has a chance to receive paging at the beginning of a paging cycle, referred to as initial paging in the embodiment of the invention, and the base station pages repeatedly the terminal requiring coverage enhancement, in a preset number of consecutive sub-frames in which paging can be performed, in at least one paging cycle after initial paging. Stated otherwise, the base station retransmits paging in a plurality of consecutive sub-frames in which paging can be performed, after a legacy paging sub-frame of the terminal, where the number N of retransmissions, and the positions of the available paging sub-frames can be prescribed in a protocol, or broadcast by the base station to the UE. In FIG. 4, the position of initial paging is denoted by a column with slanted lines, and the positions of repeated paging are denoted by columns with horizontal lines.

Thus an MTC terminal firstly needs to determine whether coverage enhancement is required for the MTC terminal, possibly by determining whether a downlink channel quality is below a threshold, for example, if RSRP received by the MTC terminal is below a threshold, then the MTC terminal will determine that it is a terminal requiring coverage enhancement. If some MTC terminal determine that coverage enhancement is required for the MTC terminal, then the MTC terminal will report its own paging identifier to the base station, where the paging identifier can be UE_ID=IMSI mod 1024, or an S-Temporary Mobile Subscriber Identifier (S-TMSI), or an IMSI. The base station stores the paging identifier upon reception thereof. Subsequently if there is paging for the terminal, then the base station will retransmit paging in a plurality of consecutive available paging sub-frames in a paging cycle of the terminal as in the method illustrated in FIG. 4. In the LTE FDD system, the available paging sub-frames are sub-frames #0, #4, #5, and #9 in each radio frame; and in the LTE TDD system, the available paging sub-frames are sub-frames #0, #1, #5, and #6 in each radio frame. Also all the available paging sub-frames are sub-frames not occupied by paging for other terminals, in either the FDD or TDD system.

If the number of sub-frames in which the paging can be performed in a paging cycle is less than the preset number of times of repeated paging, then the terminal will be paged repeatedly in sub-frames in which the paging can be performed, in a next paging cycle until the preset number of times of repeated paging is reached.

The MTC terminal requiring coverage enhancement receives paging repeatedly in the plurality of consecutive sub-frames in which the paging can be performed, after the legacy paging sub-frame in each paging cycle, and then merges and decodes a plurality of received paging messages for the real paging message.

The terminal receives paging repeatedly in the plurality of consecutive sub-frames in which the paging can be performed, after the legacy paging sub-frame in each paging cycle, and then performs channel estimation, equalization, and demodulation on each received sub-frame, where demodulation is performed assuming Quadrature Phase Shift Keying (QPSK) transmission by the network side. The terminal merges demodulated soft bits of the same symbol in the plurality of sub-frames, and then firstly decodes a control channel, and then decodes a service channel according to scheduling information of the control channel to thereby obtain the real paging message; or the terminal receives paging repeatedly in the plurality of consecutive sub-frames in which the paging can be performed, after the legacy paging sub-frame in each paging cycle, and then performs channel estimation and equalization on each received sub-frame. The terminal merges results of equalizing the same Resource Element (RE) in the plurality of sub-frames, and then firstly demodulates and decodes a control channel, and then demodulates and decodes a service channel according to scheduling information of the control channel to thereby obtain the real paging message.

Of course, the terminal can alternatively merge and decode the plurality of received paging messages in another feasible way under a real condition to thereby obtain the real paging message.

Second Embodiment

In this embodiment, the base station performs paging repeatedly in discrete sub-frames in which the paging can be performed, according to a repeated paging cycle, and at this time, before the operation S302, the method further includes: the base station broadcasts to all of terminals the repeated paging cycle at which the terminal requiring coverage enhancement is paged repeatedly; and In the operation S302, after the base station initially pages the terminal requiring coverage enhancement at the beginning of the paging cycle, the base station pages repeatedly the terminal requiring coverage enhancement, in at least one paging cycle including the current paging cycle particularly as follows:

After the base station initially pages the terminal requiring coverage enhancement at the beginning of the paging cycle, the base station pages repeatedly the terminal requiring coverage enhancement, in sub-frames in which the paging can be performed, according to the repeated paging cycle in at least one paging cycle including the current paging cycle until a preset number of times of repeated paging is reached, where the repeated paging cycle is shorter than the paging cycle.

Figure 5:
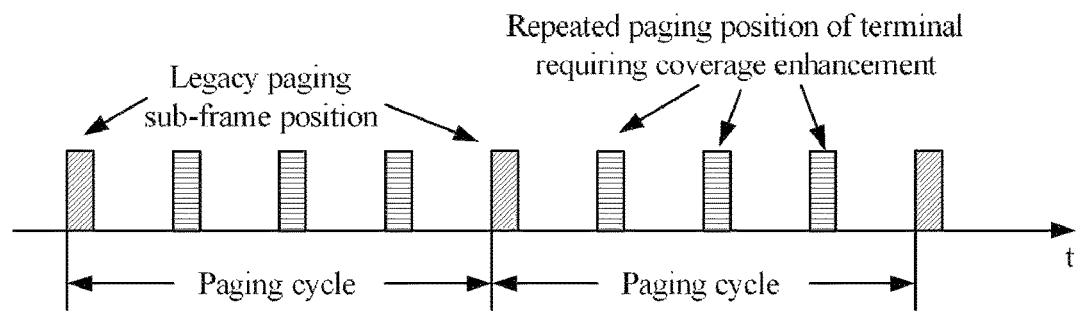
FIG. 5 is a schematic diagram of the positions of sub-frames in which a terminal receives paging according to a second embodiment of the invention.

An MTC terminal determining that coverage enhancement is required for the MTC terminal (e.g., a terminal for which the number of retransmissions for initiating a random access in the uplink is above a threshold) reports its own paging identifier to the base station, where the paging identifier can be UE_ID=IMSI mod 1024, or an S-Temporary Mobile Subscriber Identifier (S-TMSI), or an IMSI. The base station stores the paging identifier upon reception thereof. Subsequently if there is paging for the terminal, then the base station will retransmit paging according to a repeated paging cycle illustrated in FIG. 5.

In this embodiment, the repeated paging cycle is shorter than the paging cycle, for example, the base station can page repeatedly the terminal in sub-frames #5, in which the terminal can be paged among the even sub-frames after the legacy starting sub-frames, starting with SFN=0, until the preset number of times of repeated paging is reached (the sub-frames in which the paging can be performed refer to sub-frames not occupied by paging for other terminals), where the number N of times of repeated paging, and the positions of the sub-frames in which the paging is performed repeatedly can be prescribed in a protocol, or broadcast by the base station to the terminal.

If the number of repeated paging in a paging cycle does not reach the preset number of times of repeated paging, then the terminal will be further paged repeatedly still according to the repeated paging cycle in a next paging cycle, for example, if the preset number of times of repeated paging is 10, and the terminal can be paged repeatedly at most 6 times according to the repeated paging cycle in a paging cycle, then the terminal will be further paged repeatedly 4 times in a next paging cycle after the terminal is paged repeatedly 6 times in a first paging cycle. The terminal may or may not be paged repeatedly in the legacy paging sub-frame in the next paging cycle.

The MTC terminal requiring coverage enhancement receives the paging message repeatedly in sub-frames #5 among the even sub-frames after the legacy paging sub-frame, in at least one paging cycle including the paging sub-frame, where the sub-frames are sub-frames in which the paging can be performed repeatedly, and then the terminal merges and decodes the plurality of received paging messages for the real paging message.

Particularly the terminal receives the paging message repeatedly in the sub-frames #5 among the even sub-frames after the legacy paging sub-frame, in at least one paging cycle including the paging sub-frame, and then performs channel estimation, equalization, and demodulation on each received sub-frame, where demodulation is performed assuming Quadrature Phase Shift Keying (QPSK) transmission by the network side. The terminal merges demodulated soft bits of the same symbol in the plurality of sub-frames, and then firstly decodes a control channel, and then decodes a service channel according to scheduling information of the control channel to thereby obtain the real paging message; or the terminal receives the paging message repeatedly in the sub-frames #5 among the even sub-frames after the legacy paging sub-frame, in at least one paging cycle including the paging sub-frame, and then performs channel estimation and equalization on each received sub-frame. The terminal merges results of equalizing the same Resource Element (RE) in the plurality of sub-frames, and then firstly demodulates and decodes a control channel, and then demodulates and decodes a service channel according to scheduling information of the control channel to thereby obtain the real paging message.

Of course, the terminal can alternatively merge and decode the plurality of received paging messages in another feasible way under a real condition to thereby obtain the real paging message.

Furthermore since a plurality of UEs can be paged in a paging message, then if the UE requiring coverage enhancement, and a general UE are paged in the same paging message, then the general UE will also be paged repeatedly, thus resulting in an increase in paging overhead of the system. Thus a dedicated paging sub-frame can be defined for the terminal requiring coverage enhancement. At this time the terminal requiring coverage enhancement may be paged repeatedly in sub-frames which can not be used for paging in legacy system, and the base station determining the sub-frames in which the paging is performed repeatedly will notify the UE of the positions of the paging sub-frames dedicated to the terminal requiring coverage enhancement, in a broadcast message, and subsequently page the terminal repeatedly in the paging sub-frame dedicated to the terminal requiring coverage enhancement.

A particular embodiment will be described below in details.

Third Embodiment

The terminal requiring coverage enhancement may be paged repeatedly in sub-frames which can not be used for paging in legacy system, and the base station determining the sub-frames in which paging is performed repeatedly will notify the UE of the positions of the paging sub-frames dedicated to the terminal requiring coverage enhancement, in a broadcast message, and subsequently page the terminal repeatedly in the paging sub-frame dedicated to the terminal requiring coverage enhancement.

At this time before the operation S302, the method further includes:

The base station broadcasts to all of terminals the positions of the sub-frames in which the terminal requiring coverage enhancement is paged repeatedly; and In the operation S302, after the base station initially pages the terminal requiring coverage enhancement at the beginning of the paging cycle, the base station pages repeatedly the terminal requiring coverage enhancement, in at least one paging cycle including the current paging cycle particularly as follows:

After the base station initially pages the terminal requiring coverage enhancement, at the beginning of the paging cycle, the base station pages repeatedly the terminal requiring coverage enhancement, in the sub-frames at the preset positions in at least one paging cycle including the current paging cycle until the preset number of times of repeated paging is reached.

Figure 6:
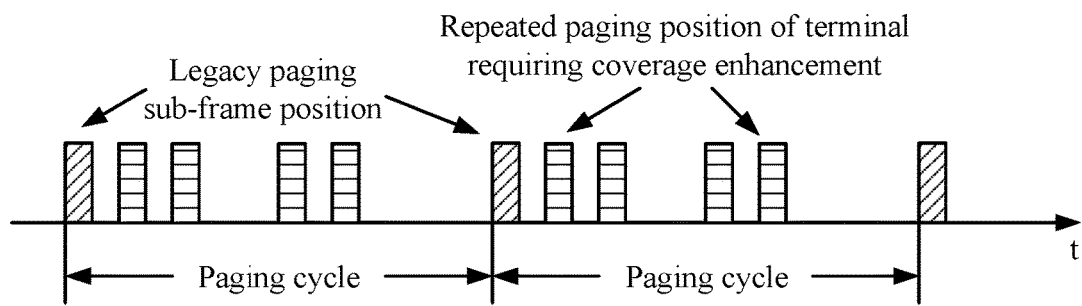
FIG. 6 is a schematic diagram of the positions of sub-frames in which a terminal receives paging according to a third embodiment of the invention.

An MTC terminal determining that coverage enhancement is required for the MTC terminal (e.g., a terminal for which coverage enhancement has been enforced to uplink transmission) reports its own paging identifier to the base station, where the paging identifier can be UE_ID=IMSI mod 1024, or an S-Temporary Mobile Subscriber Identifier (S-TMSI), or an IMSI. The base station stores the paging identifier upon reception thereof. Subsequently if there is paging for the terminal, then the base station will page repeatedly the terminal requiring coverage enhancement, in paging sub-frames dedicated to the terminal, as illustrated in FIG. 6, where the number N of times of repeated paging can be specified in a protocol, or broadcasted by the base station to the UE. For example, the sub-frames in which the terminal requiring coverage enhancement is paged repeatedly can be sub-frames #3 in respective radio frames.

The MTC terminal requiring coverage enhancement receives the paging message repeatedly in a sub-frame #3 of each radio frame in each paging cycle, and then merges and decodes the plurality of received paging messages for the real paging message.

Particularly the terminal receives the paging message repeatedly in the sub-frame #3 of each radio frame in each paging cycle, and then performs channel estimation, equalization, and demodulation on each received sub-frame, where demodulation is performed assuming Quadrature Phase Shift Keying (QPSK) transmission by the network side. The terminal merges demodulated soft bits of the same symbol in the plurality of sub-frames, and then firstly decodes a control channel, and then decodes a service channel according to scheduling information of the control channel to thereby obtain the real paging message; or the terminal receives the paging message repeatedly in the sub-frame #3 of each radio frame in each paging cycle, and then performs channel estimation and equalization on each received sub-frame. The terminal merges results of equalizing the same Resource Element (RE) in the plurality of sub-frames, and then firstly demodulates and decodes a control channel, and then demodulates and decodes a service channel according to scheduling information of the control channel to thereby obtain the real paging message.

Of course, the terminal can alternatively merge and decode the plurality of received paging messages in another feasible way under a real condition to thereby obtain the real paging message.

It shall be noted that in the paging method according to the invention, if the base station paging the terminal repeatedly determines that the terminal has received the paging message correctly, for example, the base station receives a paging response of the terminal, then the base station can stop the paging message from being further transmitted repeatedly, to thereby further save system resources.

Figure 7:
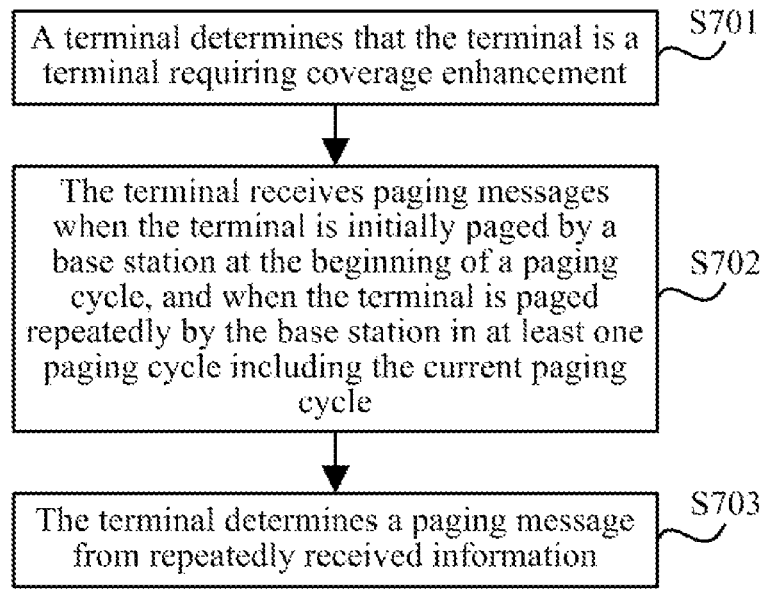
FIG. 7 is a flow diagram of a method for obtaining a paging message according to an embodiment of the invention.

An embodiment of the invention further provides a method for obtaining a paging message, as illustrated in FIG. 7, the method including:

In the operation S701, a terminal determines that the terminal itself is a terminal requiring coverage enhancement;

In the operation S702, the terminal receives paging messages when the terminal is initially paged by a base station at the beginning of a paging cycle, and when the terminal is paged repeatedly by the base station in at least one paging cycle including the current paging cycle; and In the operation S703, the terminal determines a paging message from repeatedly received information.

Here in the operation S701, the terminal determines that the terminal itself is a terminal requiring coverage enhancement, particularly as follows:

The terminal determines that the terminal itself is a terminal requiring coverage enhancement, upon determining that a downlink channel quality thereof is below a preset threshold, or that the number of retransmissions thereof for initiating a random access in the uplink is above a preset threshold, or that coverage enhancement is enforced in uplink transmission thereof.

If a report of the terminal is necessary for the base station to determine the terminal for which coverage enhancement is required, then after the terminal determines that the terminal itself is a terminal requiring coverage enhancement, in the operation S701, and before the terminal receives the paging messages when the terminal is initially paged by the base station at the beginning of the paging cycle, and when the terminal is paged repeatedly by the base station in at least one paging cycle including the current paging cycle in the operation S702, the method further includes:

The terminal determines and reports its own paging identifier to the base station.

The paging identifier can be UE_ID=IMSI mod 1024, or an S-Temporary Mobile Subscriber Identifier (S-TMSI), or an IMSI.

In correspondence to the first embodiment, the terminal receives the paging messages when the terminal is initially paged by the base station at the beginning of the paging cycle, and when the terminal is paged repeatedly by the base station in at least one paging cycle including the current paging cycle in the operation S702 particularly as follows:

The terminal receives the paging messages respectively in a sub-frame in which the terminal is initially paged by the base station at the beginning of the paging cycle, and a preset number of consecutive sub-frames in which the terminal can be paged after initial paging.

In correspondence to the second embodiment, before the terminal receives the paging messages when the terminal is initially paged by the base station at the beginning of the paging cycle, and when the terminal is paged repeatedly by the base station in at least one paging cycle including the current paging cycle, the method further includes:

The terminal receives a repeated paging cycle, broadcast by the base station, at which the terminal requiring coverage enhancement is paged repeatedly; and The terminal receives the paging messages when the terminal is initially paged by the base station at the beginning of the paging cycle, and when the terminal is paged repeatedly by the base station in at least one paging cycle including the current paging cycle particularly as follows:

The terminal receives the paging message when the terminal is initially paged by the base station at the beginning of the paging cycle, and receives the paging messages according to the repeated paging cycle in at least one paging cycle including the current paging cycle, after the initial paging, where the repeated paging cycle is shorter than the paging cycle.

In correspondence to the third embodiment, before the terminal receives the paging messages when the terminal is initially paged by the base station at the beginning of the paging cycle, and when the terminal is paged repeatedly by the base station in at least one paging cycle including the current paging cycle, the method further includes:

The terminal receives the positions, broadcast by the base station, of sub-frames in which paging is performed repeatedly; and The terminal receives the paging messages when the terminal is initially paged by the base station at the beginning of the paging cycle, and when the terminal is paged repeatedly by the base station in at least one paging cycle including the current paging cycle in the operation S702 particularly as follows:

The terminal receives the paging message when the terminal is initially paged by the base station at the beginning of the paging cycle, and receives the paging messages in the sub-frames at the preset positions in at least one paging cycle including the current paging cycle, after initial paging.

Figure 8:
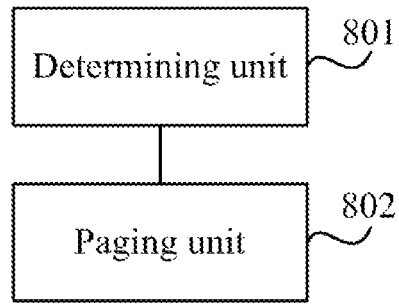
FIG. 8 is a schematic diagram of a first base station according to an embodiment of the invention.

An embodiment of the invention further correspondingly provides a base station as illustrated in FIG. 8, the base station including:

A determining unit 801 is configured to determine a terminal requiring coverage enhancement; and A paging unit 802 is configured, after the terminal requiring coverage enhancement is initially paged at the beginning of a paging cycle, to page repeatedly the terminal requiring coverage enhancement, in at least one paging cycle including the current paging cycle, so that the terminal requiring coverage enhancement determines a paging message from information received in initial paging and repeated paging.

Here in correspondence to the first embodiment, the paging unit 802 is configured:

After the terminal requiring coverage enhancement is initially paged at the beginning of the paging cycle, to page repeatedly the terminal requiring coverage enhancement, respectively in a preset number of consecutive sub-frames in which the paging can be performed, where the preset number is a preset number of times of repeated paging.

In correspondence to the second embodiment, the paging unit 802 is further configured to broadcast to all of terminals a repeated paging cycle at which the terminal requiring coverage enhancement is paged repeatedly, after the terminal requiring coverage enhancement is initially paged at the beginning of the paging cycle, and before the terminal requiring coverage enhancement is paged repeatedly in at least one paging cycle including the current paging cycle; and The paging unit 802 configured, after the terminal requiring coverage enhancement is initially paged at the beginning of the paging cycle, to page repeatedly the terminal requiring coverage enhancement, in at least one paging cycle including the current paging cycle is configured:

After the terminal requiring coverage enhancement is initially paged at the beginning of the paging cycle, to page repeatedly the terminal requiring coverage enhancement, in sub-frames in which the paging can be performed, according to the repeated paging cycle in at least one paging cycle including the current paging cycle until a preset number of times of repeated paging is reached, where the repeated paging cycle is shorter than the paging cycle.

In correspondence to the third embodiment, the paging unit 802 is further configured to broadcast to all of terminals the positions of sub-frames in which the terminal requiring coverage enhancement is paged repeatedly, after the terminal requiring coverage enhancement is initially paged at the beginning of the paging cycle, and before the terminal requiring coverage enhancement is paged repeatedly in at least one paging cycle including the current paging cycle; and The paging unit 802 configured, after the terminal requiring coverage enhancement is initially paged at the beginning of the paging cycle, to page repeatedly the terminal requiring coverage enhancement in at least one paging cycle including the current paging cycle is configured:

After the terminal requiring coverage enhancement is initially paged at the beginning of the paging cycle, to page repeatedly the terminal requiring coverage enhancement, in the sub-frames at the preset positions in at least one paging cycle including the current paging cycle until a preset number of times of repeated paging is reached.

Furthermore the determining unit is configured:

For the base station to receive a paging identifier transmitted by the terminal requiring coverage enhancement, and to determine the terminal corresponding to the paging identifier as a terminal requiring coverage enhancement.

It shall be noted that if the paging unit 802 of the base station paging the terminal repeatedly determines that the terminal has received the paging message correctly, for example, the base station receives a paging response of the terminal, then the base station can stop the paging message from being further transmitted repeatedly, to thereby further save system resources.

Figure 9:
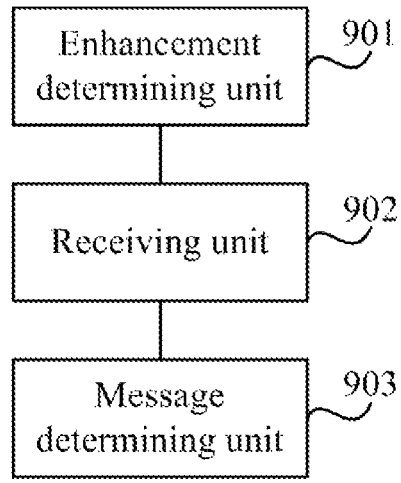
FIG. 9 is a schematic diagram of a first terminal according to an embodiment of the invention.

An embodiment of the invention further provides a terminal as illustrated in FIG. 9, the terminal including:

An enhancement determining unit 901 is configured to determine that the terminal itself is a terminal requiring coverage enhancement;

A receiving unit 902 is configured to receive paging messages when the terminal is initially paged by a base station at the beginning of a paging cycle, and when the terminal is paged repeatedly by the base station in at least one paging cycle including the current paging cycle; and A message determining unit 903 is configured to determine a paging message from repeatedly received information.

Here the enhancement determining unit 901 is configured:

For the terminal to determine that the terminal is a terminal requiring coverage enhancement, upon determining that a downlink channel quality thereof is below a preset threshold, or that the number of retransmissions thereof for initiating a random access in the uplink is above a preset threshold, or that coverage enhancement is enforced in uplink transmission thereof.

The enhancement determining unit 901 is further configured:

To determine and report its own paging identifier to the base station upon determining that the terminal is a terminal requiring coverage enhancement.

In correspondence to the first embodiment, the receiving unit 902 is configured:

To receive the paging messages respectively in a sub-frame in which the terminal is initially paged by the base station at the beginning of the paging cycle, and a preset number of consecutive sub-frames in which the paging can be performed, after initial paging.

In correspondence to the second embodiment, the receiving unit 902 is further configured:

To receive a repeated paging cycle, broadcast by the base station, at which the terminal requiring coverage enhancement is paged repeatedly, before the paging messages are received when the terminal is initially paged by the base station at the beginning of the paging cycle, and when the terminal is paged repeatedly by the base station in at least one paging cycle including the current paging cycle; and The receiving unit 902 configured to receive paging messages when the terminal is initially paged by a base station at the beginning of the paging cycle, and when the terminal is paged repeatedly by the base station in at least one paging cycle including the current paging cycle is configured:

To receive the paging message when the terminal is initially paged by the base station at the beginning of the paging cycle, and to receive the paging messages according to the repeated paging cycle in at least one paging cycle including the current paging cycle, after initial paging, where the repeated paging cycle is shorter than the paging cycle.

The receiving unit 902 is further configured:

To receive the positions, broadcast by the base station, of sub-frames in which the paging is performed repeatedly, before the paging messages are received when the terminal is initially paged by the base station at the beginning of the paging cycle, and when the terminal is paged repeatedly by the base station in at least one paging cycle including the current paging cycle; and The receiving unit 902 configured to receive paging messages when the terminal is initially paged by a base station at the beginning of the paging cycle, and when the terminal is paged repeatedly by the base station in at least one paging cycle including the current paging cycle is configured:

To receive the paging message when the terminal is initially paged by the base station at the beginning of the paging cycle, and to receive the paging messages in the sub-frames at the preset positions in at least one paging cycle including the current paging cycle, after initial paging.

An embodiment of the invention further provides a base station including:

A processor is configured to determine a terminal requiring coverage enhancement; and after the terminal requiring coverage enhancement is initially paged at the beginning of a paging cycle, to page repeatedly the terminal requiring coverage enhancement, in at least one paging cycle including the current paging cycle, so that the terminal requiring coverage enhancement determines a paging message from information received in initial paging and repeated paging.

The base station can be further configured to perform the other functions in the paging method according to the embodiment of the invention.

The base station can transmit and receive respective messages through a transceiver module and a wireless interface.

An embodiment of the invention further provides a terminal including:

A processor is configured to determine that the terminal itself is a terminal requiring coverage enhancement; to receive paging messages when the terminal is initially paged by a base station at the beginning of a paging cycle, and when the terminal is paged repeatedly by the base station in at least one paging cycle including the current paging cycle; and to determine a paging message from repeatedly received information.

The terminal can be further configured to perform the other functions in the method for obtaining a paging message according to the embodiment of the invention.

The terminal can transmit and receive respective messages through a transceiver module and a wireless interface.

Figure 10:
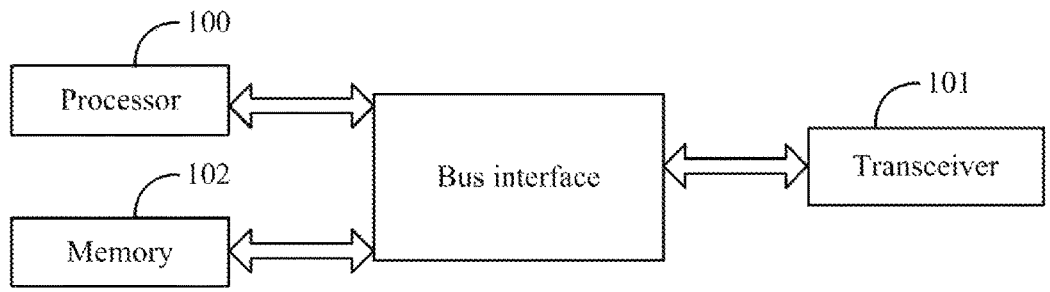
FIG. 10 is a schematic diagram of a second base station according to an embodiment of the invention.

As illustrated in FIG. 10, an embodiment of the invention provides a second base station including:

A processor 100 is configured to determine a terminal requiring coverage enhancement; and after the terminal requiring coverage enhancement is initially paged through a transceiver 101 at the beginning of a paging cycle, to page repeatedly the terminal requiring coverage enhancement, through the transceiver 101 in at least one paging cycle including the current paging cycle, so that the terminal requiring coverage enhancement determines a paging message from information received in initial paging and repeated paging; and The transceiver 101 is configured to be controlled by the processor 100 to receive and transmit data.

Here in correspondence to the first embodiment, the processor 100 is configured:

After the terminal requiring coverage enhancement is initially paged at the beginning of the paging cycle, to page repeatedly the terminal requiring coverage enhancement, respectively in a preset number of consecutive sub-frames in which the paging can be performed, where the preset number is a preset number of times of repeated paging.

In correspondence to the second embodiment, the processor 100 is further configured to broadcast to all of terminals a repeated paging cycle at which the terminal requiring coverage enhancement is paged repeatedly, after the terminal requiring coverage enhancement is initially paged at the beginning of the paging cycle, and before the terminal requiring coverage enhancement is paged repeatedly in at least one paging cycle including the current paging cycle; and The processor 100 configured, after the terminal requiring coverage enhancement is initially paged at the beginning of the paging cycle, to page repeatedly the terminal requiring coverage enhancement, in at least one paging cycle including the current paging cycle is configured:

After the terminal requiring coverage enhancement is initially paged at the beginning of the paging cycle, to page repeatedly the terminal requiring coverage enhancement, in sub-frames in which the paging can be performed, according to the repeated paging cycle in at least one paging cycle including the current paging cycle until a preset number of times of repeated paging is reached, where the repeated paging cycle is shorter than the paging cycle.

In correspondence to the third embodiment, the processor 100 is further configured to broadcast to all of terminals the positions of sub-frames in which the terminal requiring coverage enhancement is paged repeatedly, after the terminal requiring coverage enhancement is initially paged at the beginning of the paging cycle, and before the terminal requiring coverage enhancement is paged repeatedly in at least one paging cycle including the current paging cycle; and The processor 100 configured, after the terminal requiring coverage enhancement is initially paged at the beginning of the paging cycle, to page repeatedly the terminal requiring coverage enhancement in at least one paging cycle including the current paging cycle is configured:

After the terminal requiring coverage enhancement is initially paged at the beginning of the paging cycle, to page repeatedly the terminal requiring coverage enhancement in the sub-frames at the preset positions in at least one paging cycle including the current paging cycle until a preset number of times of repeated paging is reached.

Furthermore the processor 100 is configured:

For the base station to receive a paging identifier transmitted by the terminal requiring coverage enhancement, and to determine the terminal corresponding to the paging identifier as a terminal requiring coverage enhancement.

It shall be noted that if the processor 100 of the base station paging the terminal repeatedly determines that the terminal has received the paging message correctly, for example, the base station receives a paging response of the terminal, then the base station can stop the paging message from being further transmitted repeatedly, to thereby further save system resources.

Here in FIG. 10, a bus architecture can include any number of interconnection buses and bridges which are particularly configured to link various circuits together including one or more processor represented by the processor 100, and a memory represented by a memory 102. The bus architecture can link various other circuits together, e.g., peripheral devices, a manostat, a power management circuit, etc., all of which are well known in the art, so a repeated description thereof will be omitted in this context. A bus interface provides an interface. The transceiver 101 can include a plurality of elements including a transmitter and a receiver configured to provide elements communicating with other various apparatuses over a transmission medium. The processor 100 is responsible for managing the bus architecture and typical processes, and the memory 102 can store data used by the processor 100 in performing operations.

The processor 100 is responsible for managing the bus architecture and typical processes, and the memory 102 can store data used by the processor 100 in performing operations.

Figure 11:
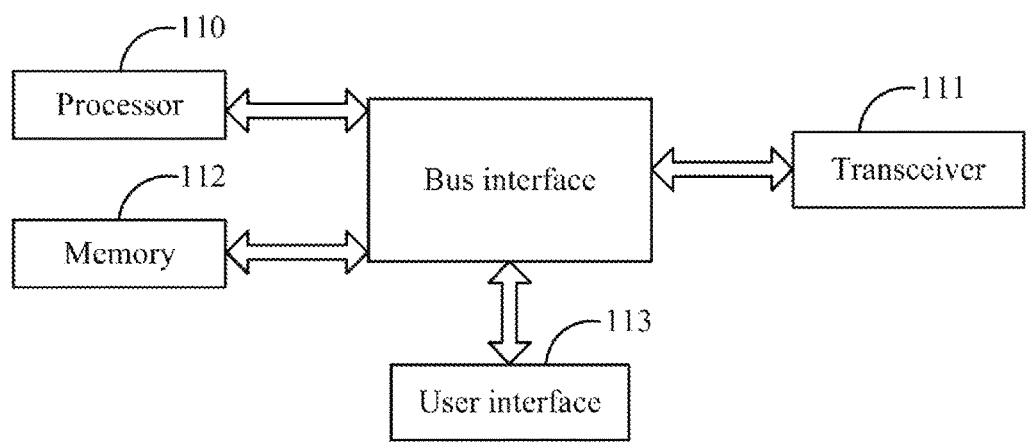
FIG. 11 is a schematic diagram of a second terminal according to an embodiment of the invention.

As illustrated in FIG. 11, an embodiment of the invention provides a second terminal including:

A processor 110 is configured to determine that the terminal is a terminal requiring coverage enhancement; to receive paging messages through a transceiver 111 when the terminal is initially paged by a base station at the beginning of a paging cycle, and when the terminal is paged repeatedly by the base station in at least one paging cycle including the current paging cycle; and to determine a paging message from repeatedly received information; and The transceiver 111 is configured to be controlled by the processor 110 to receive and transmit data.

Here the processor 110 is configured:

For the terminal to determine that the terminal is a terminal requiring coverage enhancement, upon determining that a downlink channel quality thereof is below a preset threshold, or that the number of retransmissions thereof for initiating a random access in the uplink is above a preset threshold, or that coverage enhancement is enforced in uplink transmission thereof.

The processor 110 is further configured:

To determine and report its own paging identifier to the base station upon determining that the terminal is a terminal requiring coverage enhancement.

In correspondence to the first embodiment, the processor 110 is configured:

To receive the paging messages respectively in a sub-frame in which the terminal is initially paged by the base station at the beginning of the paging cycle, and in a preset number of consecutive sub-frames in which the paging can be performed, after initial paging.

In correspondence to the first embodiment, the processor 110 is further configured:

To receive a repeated paging cycle, broadcast by the base station, at which the terminal requiring coverage enhancement is paged repeatedly, before the paging messages are received when the terminal is initially paged by the base station at the beginning of the paging cycle, and when the terminal is paged repeatedly by the base station in at least one paging cycle including the current paging cycle; and The processor 110 configured to receive paging messages when the terminal is initially paged by a base station at the beginning of the paging cycle, and when the terminal is paged repeatedly by the base station in at least one paging cycle including the current paging cycle is configured:

To receive the paging message when the terminal is initially paged by the base station at the beginning of the paging cycle, and to receive the paging messages according to the repeated paging cycle in at least one paging cycle including the current paging cycle, after initial paging, where the repeated paging cycle is shorter than the paging cycle.

The processor 110 is further configured:

To receive the positions, broadcast by the base station, of sub-frames in which paging is performed repeatedly, before the paging messages are received when the terminal is initially paged by the base station at the beginning of the paging cycle, and when the terminal is paged repeatedly by the base station in at least one paging cycle including the current paging cycle; and The processor 110 configured to receive paging messages when the terminal is initially paged by a base station at the beginning of the paging cycle, and when the terminal is paged repeatedly by the base station in at least one paging cycle including the current paging cycle is configured:

To receive the paging message when the terminal is initially paged by the base station at the beginning of the paging cycle, and to receive the paging messages in the sub-frames at the preset positions in at least one paging cycle including the current paging cycle, after initial paging.

Here in FIG. 11, a bus architecture can include any number of interconnection buses and bridges which are particularly configured to link various circuits together including one or more processor represented by the processor 110, and a memory represented by a memory 112. The bus architecture can link various other circuits together, e.g., peripheral devices, a manostat, a power management circuit, etc., all of which are well known in the art, so a repeated description thereof will be omitted in this context. A bus interface provides an interface. The transceiver 111 can include a plurality of elements including a transmitter and a receiver configured to provide elements communicating with other various apparatuses over a transmission medium. For different user equipment, a user interface 113 can also be an interface via which needed internal and external devices can be connected, where the connected devices include but will not be limited to a keypad, a display, a speaker, a microphone, a joystick, etc.

The processor 110 is responsible of managing the bus architecture and of normal processes, and the memory 112 can store data used by the processor 110 in operation.

The embodiments of the invention provide a paging method, obtaining a paging message method, a base station and a terminal, where after the terminal requiring coverage enhancement is paged, the terminal is paged repeatedly in at least one paging cycle including a current paging cycle so that the terminal requiring coverage enhancement determines a paging message from information received in initial paging and repeated paging to thereby reduce the occurrences of the terminal missing paging and thus failing to be called.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A paging method, the method comprising:
determining, by a base station, a terminal requiring coverage enhancement; and
after the terminal requiring coverage enhancement is initially paged at a beginning of a paging cycle, paging repeatedly, by the base station, the terminal requiring coverage enhancement, in at least one paging cycle comprising the current paging cycle, so that the terminal requiring coverage enhancement determines a paging message from information received in initial paging and repeated paging;
wherein after the base station initially pages the terminal requiring coverage enhancement, at the beginning of the paging cycle, and before the base station pages repeatedly the terminal requiring coverage enhancement, in at least one paging cycle comprising the current paging cycle, the method further comprises:
broadcasting, by the base station, to all of terminals positions of dedicated sub-frames in which the terminal requiring coverage enhancement, is paged repeatedly; wherein the dedicated sub-frames are not used for paging in a legacy system; and
paging repeatedly, by the base station, the terminal requiring coverage enhancement, in at least one paging cycle comprising the current paging cycle comprises:
paging repeatedly, by the base station, the terminal requiring coverage enhancement, in the dedicated sub-frames at preset positions in at least one paging cycle comprising the current paging cycle until a preset number of times of repeated paging is reached.

2. The method according to claim 1, wherein determining, by the base station, the terminal requiring coverage enhancement comprises:
receiving, by the base station, a paging identifier transmitted by the terminal requiring coverage enhancement, and determining the terminal corresponding to the paging identifier as a terminal requiring coverage enhancement.

3. A method for obtaining a paging message, the method comprising:
determining, by a terminal, that the terminal is a terminal requiring coverage enhancement;
receiving, by the terminal, paging messages when the terminal is initially paged by a base station at a beginning of a paging cycle, and when the terminal is paged repeatedly by the base station in at least one paging cycle comprising the current paging cycle; and
determining, by the terminal, a paging message from repeatedly received information;
wherein before the terminal receives the paging messages when the terminal is initially paged by the base station at the beginning of the paging cycle, and when the terminal is paged repeatedly by the base station in at least one paging cycle comprising the current paging cycle, the method further comprises:
receiving, by the terminal, positions, broadcast by the base station, of dedicated sub-frames in which the paging is performed repeatedly; wherein the dedicated sub-frames are not used for paging in a legacy system; and
receiving, by the terminal, the paging messages when the terminal is initially paged by the base station at the beginning of the paging cycle, and when the terminal is paged repeatedly by the base station in at least one paging cycle comprising the current paging cycle comprises:
receiving, by the terminal, the paging message when the terminal is initially paged by the base station at the beginning of the paging cycle, and receiving the paging messages in the dedicated sub-frames at preset positions in at least one paging cycle comprising the current paging cycle, after initial paging.

4. The method according to claim 3, wherein determining, by the terminal, that the terminal is a terminal requiring coverage enhancement comprises:
determining, by the terminal, that the terminal is the terminal requiring coverage enhancement, upon determining that a downlink channel quality thereof is below a preset threshold, or that a number of retransmissions thereof for initiating a random access in an uplink is above a preset threshold, or that coverage enhancement is enforced in uplink transmission thereof.

5. The method according to claim 3, wherein after the terminal determines that the terminal is the terminal requiring coverage enhancement, and before the terminal receives the paging messages when the terminal is initially paged by the base station at the beginning of the paging cycle, and when the terminal is paged repeatedly by the base station in at least one paging cycle comprising the current paging cycle, the method further comprises:
determining and reporting, by the terminal, its own paging identifier to the base station.

6. A terminal, comprising:
a processor;

a memory, wherein the memory stores one or more computer readable program codes, and the processor is configured to execute the computer readable program codes to:

determine that the terminal is a terminal requiring coverage enhancement;

receive paging messages through a transceiver when the terminal is initially paged by a base station at a beginning of a paging cycle, and when the terminal is paged repeatedly by the base station in at least one paging cycle comprising the current paging cycle; and determine a paging message from repeatedly received information;

and the transceiver is configured to be controlled by the processor to receive and transmit data;

wherein the processor is further configured to execute the computer readable program codes to:

receive positions, broadcast by the base station, of dedicated sub-frames in which the paging is performed repeatedly, before the paging messages are received when the terminal is initially paged by the base station at the beginning of the paging cycle, and when the terminal is paged repeatedly by the base station in at least one paging cycle comprising the current paging cycle; wherein the dedicated sub-frames are not used for paging in a legacy system; and receive the paging message when the terminal is initially paged by the base station at the beginning of the paging cycle, and to receive the paging messages in the dedicated sub-frames at preset positions in at least one paging cycle comprising the current paging cycle, after initial paging.

7. The terminal according to claim 6, wherein the processor is further configured to execute the computer readable program codes to:

determine that the terminal is a terminal requiring coverage enhancement, upon determining that a downlink channel quality thereof is below a preset threshold, or that a number of retransmissions thereof for initiating a random access in an uplink is above a preset threshold, or that coverage enhancement is enforced in uplink transmission thereof.

8. The terminal according to claim 6, wherein the processor is further configured to execute the computer readable program codes to:

determine and report its own paging identifier to the base station upon determining that the terminal is a terminal requiring coverage enhancement.

* * * * *